(No Model.)
C. A. MEISTER.
DENTAL MATRIX.
No. 452,231. Patented May 12, 1891.
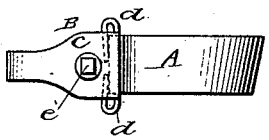
Fig. 1.
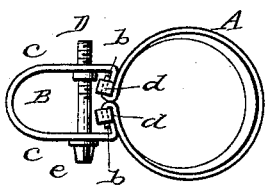
Fig. 2.
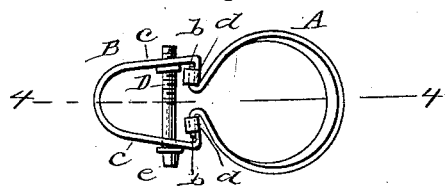
Fig. 3.
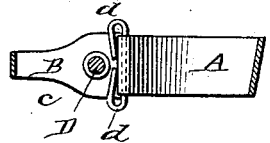
Fig. 4.
Fig. 5.
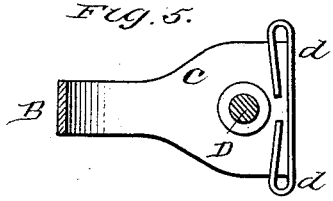
Fig. 6.
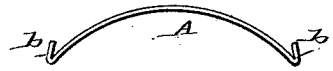
Fig. 9.
Fig. 7.
Fig. 8.
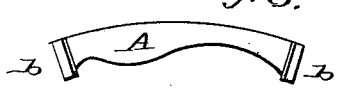
WITNESSES:
W. R. Davis.
C. Sedgwick
INVENTOR:
C. A. Meister
BY
Munn & Co.
ATTORNEYS

UNITED STATES PATENT OFFICE.

CHRISTIAN A. MEISTER, OF ALLENTOWN, PENNSYLVANIA.

DENTAL MATRIX.

SPECIFICATION forming part of Letters Patent No. 452,231, dated May 12, 1891.

Application filed January 23, 1891. Serial No. 378,767. (No model.)

*To all whom it may concern:*

Be it known that I, CHRISTIAN A. MEISTER, of Allentown, in the county of Lehigh and State of Pennsylvania, have invented a new and Improved Dental Matrix, of which the following is a full, clear, and exact description.

The object of my invention is to provide a dental matrix and clamping means to be used on a tooth while being filled, which while efficient shall be comparatively simple and inexpensive; and the invention consists in certain novel constructions and combinations of parts, substantially as hereinafter described, and more particularly pointed out in the claims.

Reference is to be had to the accompanying drawings, forming a part of this specification, in which similar letters of reference indicate corresponding parts in all the figures.

Figure 1 represents a side view of a dental matrix embodying my invention, the same including a band designed to receive the tooth within it and forming the matrix proper, and an adjustable detachable jaw-like device for operating and tightening said band about or around the tooth. Fig. 2 is a plan view of the same, showing the band closed; Fig. 3, a plan view thereof, showing the band expanded; Fig. 4, a longitudinal section upon the line 4 4 in Fig. 3. Fig. 5 is a longitudinal section, substantially on the line 4 4 in Fig. 3, of the jaw-like device portion of the matrix upon a larger scale; Fig. 6, a longitudinal edge view of the band portion of the matrix detached; Fig. 7, an outer face view of the same detached, and Fig. 8 an outer face view of a modified form of the band. Fig. 9 is a partly sectional longitudinal view of a wrench used in connection with the matrix.

A indicates the band or matrix proper, which is made of flat flexible sheet metal of any desired size, so that when bent into circular or loop form it will embrace the tooth to be operated upon. This band, of which there may be any number to suit different-sized teeth and requirements, is made readily attachable to and detachable from the closing or jaw-like device portion B of the matrix, thus making the matrix-closing or jaw-like device answer for numerous bands. These bands, in their normal shape or when spread out and before applying them to their jaw-like closing device B, are of approximately flat arched form in direction of their length, as shown in Figs. 7 and 8, which represent two shapes of band so far as their inner longitudinal margin is concerned, and in this respect they are not limited to any particular shape; but in each case they are essentially flat arched bands in direction of their length and bent over at their ends to form engaging or hooking lips $b$ $b$ to engage with the jaw-like or closing device B, so that when applied to and contracted into loop shape by the latter they will present a beveled configuration in direction of their depth, gradually approaching a straight form toward their closing ends, as shown in Figs. 1, 2, 3, and 4, due to the chord of their inner arched edge being less than the chord of their outer arched edge. By this construction the band is caused to make a closer fit to a tooth which is generally largest at or near its grinding-point.

The closing device or portion B of the matrix is of loop-like construction, made of spring metal, and bent to form two opposite forwardly-projecting jaws $c$ $c$, terminating at their free ends in inwardly-bent-over double loops $d$ $d$, running transversely of the width of the jaws and made of greater interior capacity at their outer than at their inner ends, as clearly shown in Fig. 5, for one of the jaws with its loop-like ends. Thus these loop-like ends present tapering slots contracting so as to meet, or nearly so, at their inner ends and having a slight spring in them. The band A is engaged by its bent-over end lips $b$ $b$ in these slotted terminal or loop portions $d$ $d$ of the closing device B by first entering or starting the outer corner or angular end of each lip $b$ in succession within the larger outer ends of the loops $d$ of each jaw and then pushing them down to their places wholly within the loops, which, pushing them to their places, may be done by the flat back handle end of a wrench C and the same tool be used for disengaging the lips $b$ from the loops $d$ when required to remove or change the band A. When the lips $b$ are fully engaged with the loops $d$, the closing and spring-like action of said loops serves to securely hold them engaged.

The jaws $c$ $c$ of the closing device B are closed or opened to contract the band A, so as to make it grip or embrace the tooth or to expand the band to facilitate its fit over the tooth and to free it when required from hold on the tooth by means of a transverse screw D, loosely engaging by a flange on its head end with the one jaw c and screwing into or through the other jaw c or a boss thereon. This jaw-operating screw D is manipulated as required to screw or unscrew it by the wrench C, which is of angular socket construction at its front end, and is capable of being readily engaged with and disengaged from the angular head e of the screw.

Having thus described my invention, what I claim as new, and desire to secure by Letters Patent, is—

1. A matrix for teeth, consisting of a tooth-embracing flat flexible band provided with hooking or engaging lips at its ends and a jaw-like closing device provided with pocket-forming loops at its free ends adapted to receive and hold the lips of the band within them and to provide for the ready detachment of the band when required, and an adjustable means for contracting the jaws of the closing device, substantially as specified.

2. A matrix for teeth, consisting of a detachable flat flexible band having engaging hooks or lips at its ends and a jaw-like closing device of spring construction provided with a transverse adjusting means and with spring-loops at its ends of tapering construction, presenting greater widths of opening at their outer ends adapted to receive the lips of the band within them, essentially as described.

3. In a dental appliance of the character set forth, the matrix-closing device consisting in the U-shaped spring having its ends terminating in inwardly-bent-over double loops $d\ d$, extending transversely of the width of the jaws $c\ c$ and of greater interior capacity at their outer than at their inner ends, and the adjusting-screw connecting the said jaws or members $c\ c$, substantially as set forth.

CHRISTIAN A. MEISTER.

Witnesses:
THOMAS O. GINKINGER,
HARRY L. QUIER.